Dec. 27, 1927.
A. J. MICHELIN
1,654,380
MEANS FOR SECURING TIRES ON RIMS
Filed May 12, 1927   5 Sheets-Sheet 2
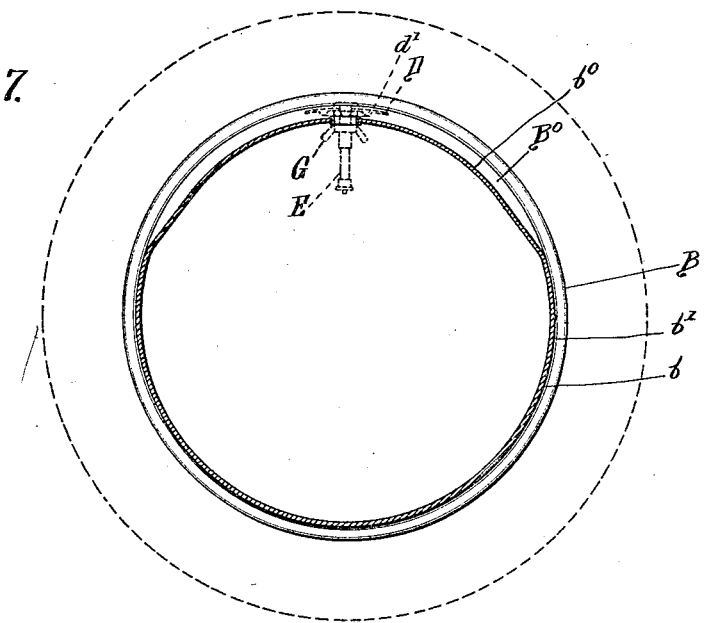
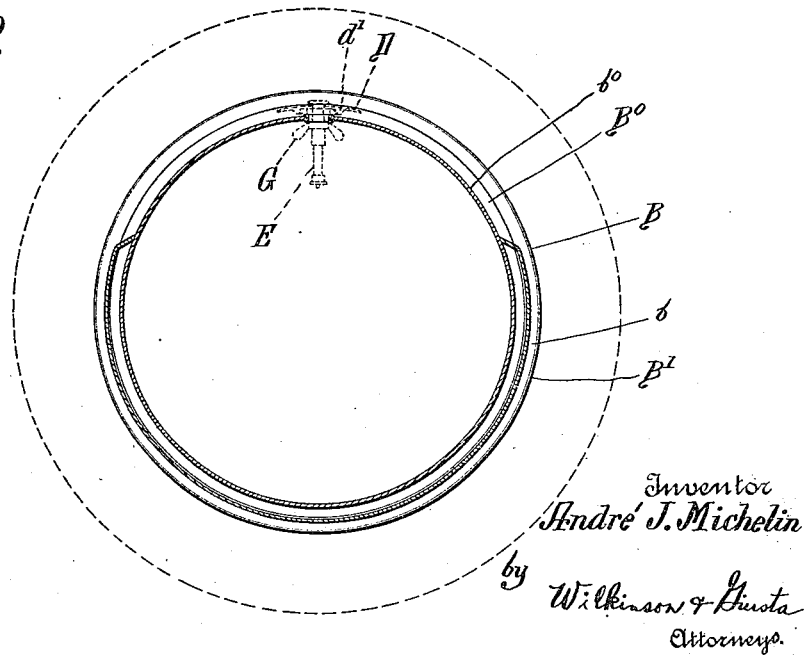
Inventor
André J. Michelin
by Wilkinson & Giusta
Attorneys.

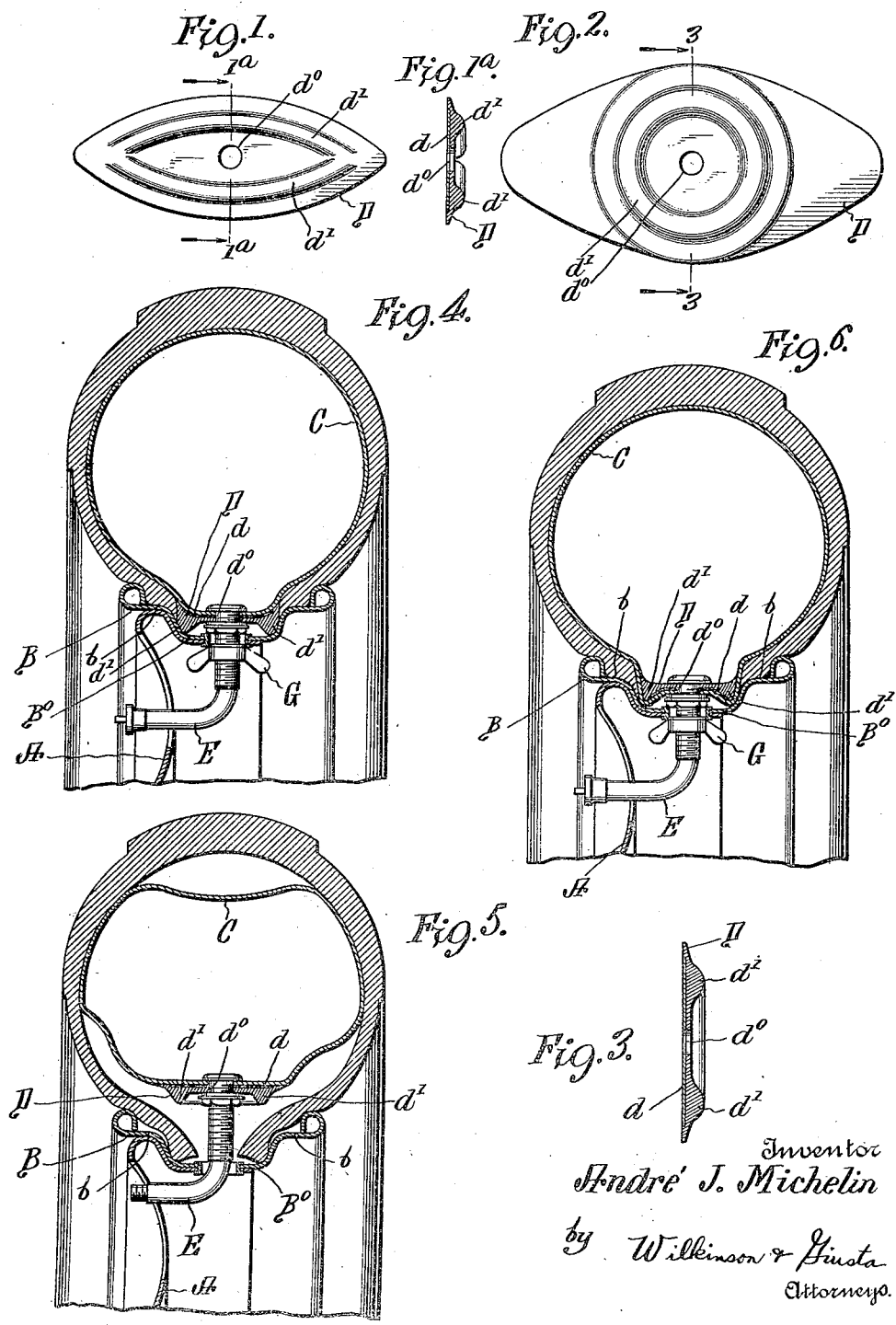

Dec. 27, 1927.  
A. J. MICHELIN  
MEANS FOR SECURING TIRES ON RIMS  
Filed May 12, 1927  
1,654,380  
5 Sheets-Sheet 3
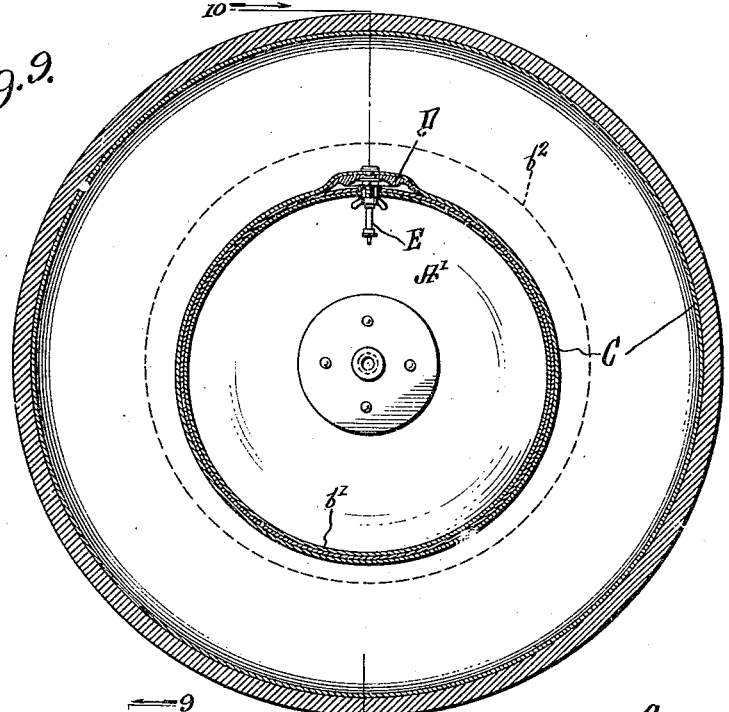
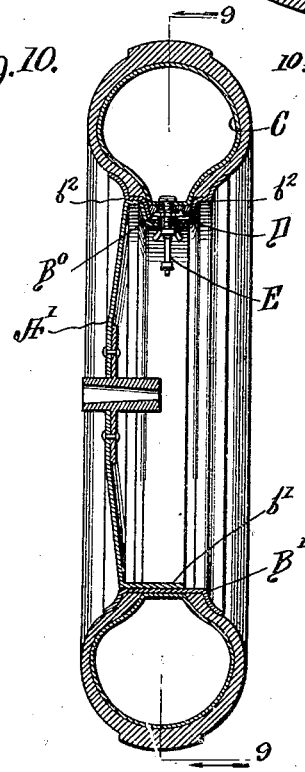
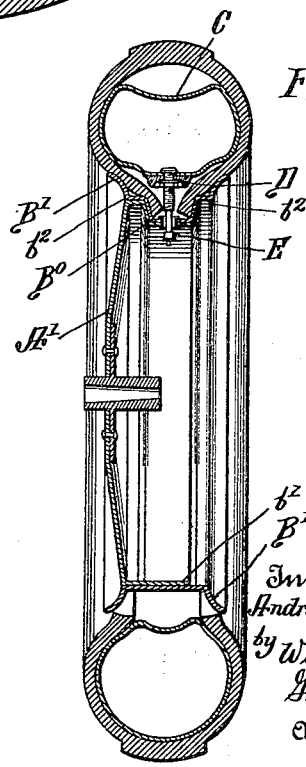
Inventor  
André J. Michelin  
by Wilkinson &  
Giusta  
Attorneys.

Dec. 27, 1927.

A. J. MICHELIN 1,654,380

MEANS FOR SECURING TIRES ON RIMS

Filed May 12, 1927    5 Sheets-Sheet 4

Inventor
André J. Michelin
by Wilkinson & Giusta
Attorneys

Patented Dec. 27, 1927.

1,654,380

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

MEANS FOR SECURING TIRES ON RIMS.

Application filed May 12, 1927, Serial No. 190,896, and in France October 18, 1926.

In the recent development of the modes of applying pneumatic tires to the rims of automobiles and other vehicles in such a manner that the deflated tires may be quickly applied to or removed from the rim when desired and yet held firmly on the rim whether the tire is in the inflated or deflated condition, what is known as deep rims have been largely used. These rims may consist either of a channeled rim having a continuous depression or groove around the center of the circumference thereof, or this groove may and preferably should extend only through a portion of the circumference of the rim. Such portion provided with the groove is preferably less than 180 degrees of the circumference of the rim and it has been found in practice more convenient to have the groove extend only through an arc of approximately 140 to 160 degrees of the circumference of the rim. Such rims are described in my application Serial No. 705,605, filed April 10, 1924, and entitled Improvements in deep rims for pneumatic tires, and also in the division of the application referred to, filed February 18, 1927, Serial No. 169,368, and also entitled Improvements in deep rims for pneumatic tires; and also in my application filed March 4, 1927, Serial No. 172,893, and entitled Improvements in vehicle wheels.

With rims of this construction, the beads normally rest on annular shoulders or seats of the rim at either side of the groove and when it is desired to remove the tire, the beads are pressed down into the groove and the tire casing is slipped over the rim at the edge opposite the groove, as fully described in my applications aforesaid.

There would be a tendency when the tire becomes deflated on the road, of the beads to slip down into the grooves and for the tire to come off while the car is in motion, unless some positive means were provided for preventing the beads from entering the groove except when the operator desires to have them do so; and the purpose of my present invention is to provide a movable obstruction or obstructions by which the beads are prevented from sliding into the groove unless, and until this obstruction is removed; and also to produce an obstruction which may be quickly and conveniently moved from the safety or holding position to the releasing position; and also to provide an obstruction, which will not injure the inner tube or other portions of the tire when in use; and also to provide an obstruction, which may be conveniently applied to, or used in connection with the inner tube of the tire, as will be hereinafter more fully described and claimed.

Reference is had to the accompanying drawings, in which like parts are indicated by similar reference symbols throughout the several views, and in which:

Figure 1 shows one form of bridge piece or pad made of soft rubber or similar material, which is adapted to be attached to the inner tube of the tire;

Figure $1^a$ shows a section along the line $1^a$—$1^a$ in Figure 1, looking in the direction of the arrows;

Figure 2 shows another form of bridge piece which differs slightly in shape from that shown in Figure 1, but is made of similar material;

Figure 3 shows a section along the line 3—3 in Figure 2, and looking in the direction of the arrows;

Figure 4 shows a section through the tire rim and the periphery of the body of a disc wheel, showing the bridge piece attached to that portion of the inner tube adjacent to the valve stem, and this shows the inner tube inflated and the bridge piece in the safety position in which it obstructs the groove and prevents the beads of the tire from creeping down into said groove;

Figure 5 is a similar view to Figure 4, but shows the inner tube deflated and the bridge piece moved inward to permit the beads of the tire from being moved into the groove.

In Figures 4 and 5, the bridge piece is shown as attached to the outside of the inner tube, in lieu of the usual reinforcement of the inner tube at the valve stem.

Figure 6 shows a similar view to Figure 4, except that the bridge piece is mounted on the inside of the inner tube and also serves to reinforce the inner tube at the region near the valve stem.

Figure 7 is a sectional elevation of a channeled rim having a cylindrical bottom with the deep groove extending only part of the way around, and shows the bridge piece and valve stem and the tire casing in dotted lines.

Figure 8 is a similar view to Figure 7, except that it shows a form of channeled rim in which the continuous deep groove is partly filled up by a false bottom or filling strip.

Figure 9 shows a central transverse section through an eccentric disc wheel, with a balloon tire mounted thereon and provided with a bridge piece for holding the tire on the rim, the section being along the line 9—9 of Figure 10.

Figure 12:
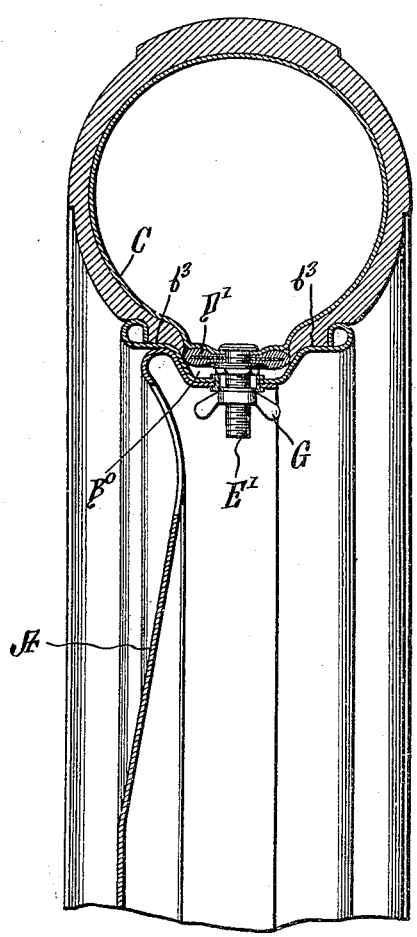
Figure 13:
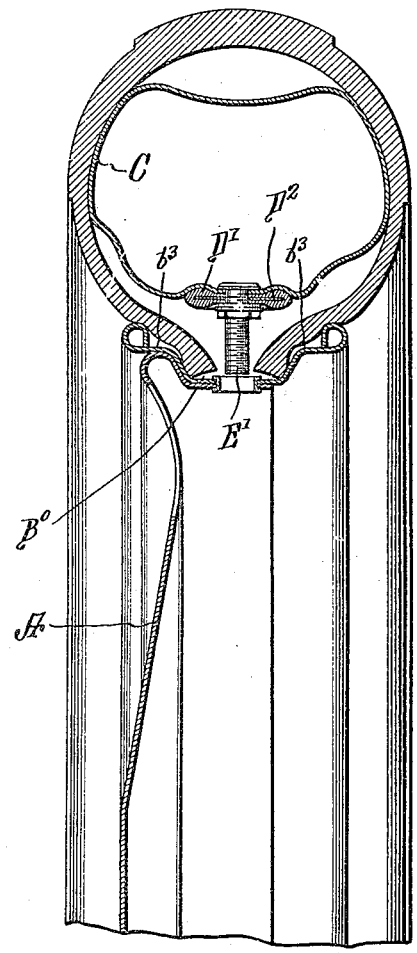
Figure 14:
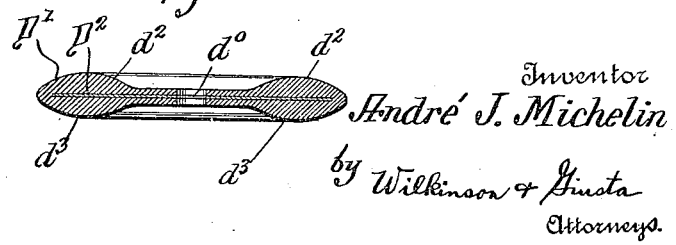
Figure 15:
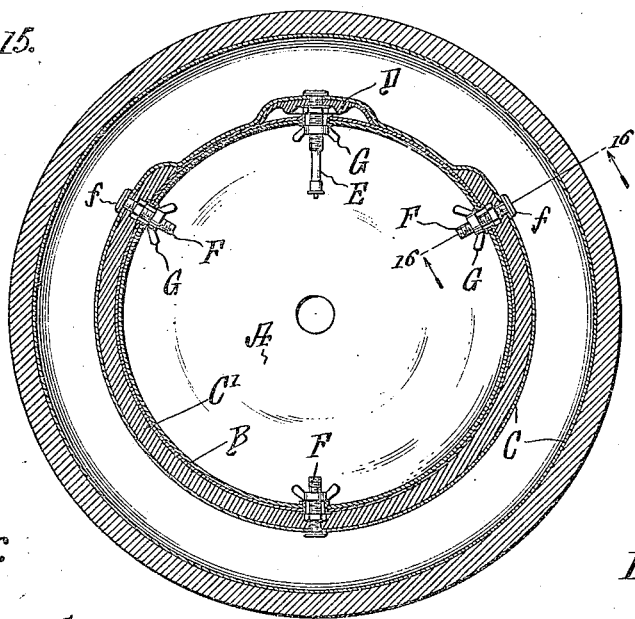
Figure 16:
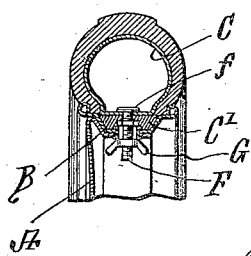
Figure 18:
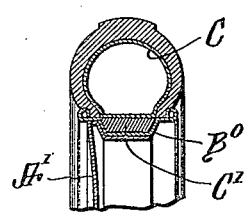
Figure 17:
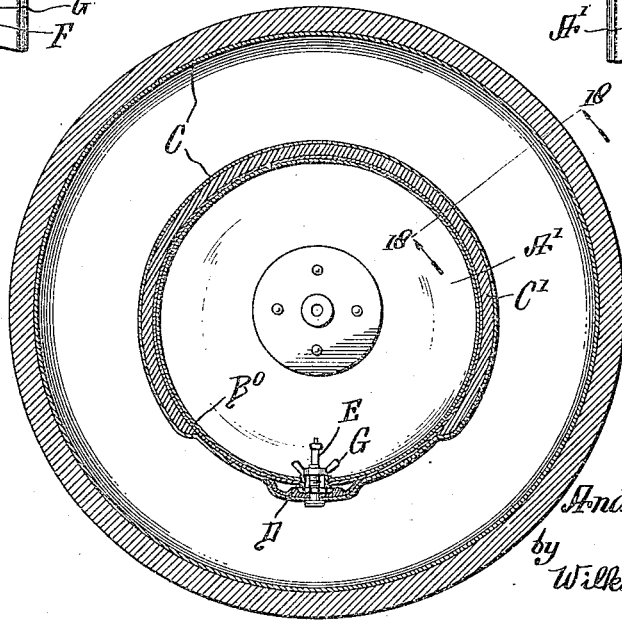

Figure 10 shows a cross-section along the line 10—10 of Figure 9 and looking in the direction of the arrows, and shows a tire securely held on the rim, with the bridge piece in the groove of the rim;

Figure 11 is a similar view to Figure 10, except that the inner tube is deflated and the bridge piece moved upward and the beads of the tire moved down into the groove, as when removing the deflated tire from the rim;

Figures 12 and 13 show sections through another form of rim and wheel disc employing a modified form of bridge piece; Figure 12 showing the bridge piece in the groove for holding the beads of the tire casing on their seats, and Figure 13 showing the bridge piece moved outwardly with the beads of the tire casing moved down into the groove of the rim, as for removing the tire from the rim;

Figure 14 is a detail view on a larger scale, showing a transverse section of the bridge piece shown in Figs. 12 and 13;

Figure 15 shows a central section through the plane of a wheel in which the inner tube is provided with the reinforcing strip to enter into the groove of a deep rim, with additional securing bolts therefor and with an additional bridge piece provided between the ends of said reinforcing strip;

Figure 16 is a section along the line 15—15 of Figure 15, and looking in the direction of the arrows;

Figure 17 is a similar view to Figure 15, except that a single securing bolt is used, preferably the valve stem; and Figure 18 shows a section along the line 18—18 of Figure 17, and looking in the direction of the arrows.

Referring first to Figures 1 to 8, A represents the wheel body, which is shown as of the well-known form of disc wheel, but this invention is intended to be applied to any suitable form of wheel body, and is not limited to disc wheels. B represents the metal rim, which may be made of any suitable form of cross section, but is provided with the deep groove $B^0$. Extending through part or all of its circumference at each side of this deep groove $B^0$, are annular shoulders or seats $b$ for the beads of the tire when the tire is inflated, as shown in Figures 4 and 6. In Figure 7, I have shown the deep groove $B^0$ extending only through a part of the circumference of the rim, the bottom $b^0$ of which groove projects below the annular bottom $b'$ of the channel in the rest of the rim, on which the tire normally seats. The bead seats $b$ at each side of this groove $B^0$ are provided to seat the beads of the tire when the tire is in the inflated position.

In Figure 8 I have shown a form of rim in which the groove $B^0$ was originally extended through the entire circumference of the rim, but this groove is partly filled up with a false bottom $B'$, leaving only a small portion of the deep groove in which the beads of the tire can enter. With regard to the deep groove, these are the preferred forms of rim, and necessitate the employment of only one bridge piece; but the rim may be left continuous and a plurality of bridge pieces employed as will be hereinafter described.

C represents the inner tube of the tire to which the bridge piece may be conveniently attached either inside or outside, and preferably at the valve stem, as shown outside of the inner tube in Figures 4 and 5, or inside of the inner tube in Figure 6. In Figures 1 and $1^a$, D represents an elongated substantially flat pad of rubber preferably reinforced as at $d$ with canvas or other suitable material, and provided with yielding ribs $d'$ and a bolt hole $d^0$, the whole pad resembling a partly closed eye. In Figures 2 and 3, the construction is similar except that the raised portion or rib $d'$ is circular. The bridge piece or pad shown in either form may be cemented to the inner tube at any desired position, preferably in the region of the valve stem. In Figures 4 and 5, I have shown the bridge piece cemented to the outside of the valve stem with the valve stem E passing through the bolt hole $d^0$, but it may be attached to the exterior of the inner tube at any other desired position. In Figure 6, I have shown the bridge piece mounted on the inside of the inner tube with the valve stem E also passing through the perforations $d^0$. In either form of construction, the bridge piece will serve to reinforce the inner tube in the region of the valve stem and will thus supplement the reinforcement usually provided for the inner tube at that place, or replace the reinforcement of the inner tube, if desired. Thus, the bridge piece may be applied to either the inside or the outside of the inner tube.

When the inner tube is inflated, as shown in Figures 4 and 6, the projections $d'$ will be forced down into the deep groove and the bridge piece will obstruct the entrance of the beads to the groove; but when the tire is deflated, as shown in Figure 5, the bridge piece may be conveniently moved outwards, permitting the beads of the tire to be moved down into the groove $B^0$, as shown in Figure 5.

As noted with reference to Figures 7 and 8, as the groove $B^0$ extends only through a portion of the circumference of the rim, a single obstruction in the form of a bridge piece will suffice, as shown in dotted lines in said figures.

In Figs. 9, 10 and 11, I have shown the invention as applied to an eccentric disc wheel of the type disclosed in my before mentioned application, Serial No. 172,893, filed March 4, 1927, and entitled Improvements in vehicle wheels. In these figures, the eccentric wheel disc A' is surrounded by a rim B' having circular bead seats $b'$, $b^2$, as described in my application aforesaid. In such case a single bridge piece D, carried by the valve stem E and fitting in the crescent shaped groove $B^0$ will securely hold the tire on the rim, when in the position shown in Fig. 10, but will permit the tire to be removed when in the position shown in Fig. 11.

In Figs. 12 to 14, I have shown a modified form of bridge piece D' comprising a pad of rubber in which a thin resilient metal plate $D^2$ is embedded. Opposite sides of the pad are provided with rubber cushions $d^2$ and $d^3$, and the pad and plate are provided with a bolt hole $d^0$, to receive the securing bolt E' carried by the inner tube C. The bridge piece D' is preferably cemented to the inner tube, and thus forms a reinforcement for the region of said tube through which the securing bolt E' passes. Either a separate securing bolt and nut G may be used, or the valve stem may serve as a securing bolt, as shown in Figs. 4, 5, and 6.

In Fig. 12, I have shown the bridge piece D' drawn into the groove $B^0$ of the rim B, carried by the wheel disc A, thus holding the beads of the tire casing on the seats $b^3$, as normally desired. In Fig. 13, I have shown the bridge piece forced inwards, and the beads of the casing drawn into the groove $B^0$, for removing the tire, when deflated, from the rim.

In Figs. 15 to 18, I have shown the inner tube C provided with a reinforcing strip C', which may be made of rubber reinforced with fabric and cemented or otherwise attached to the face of the inner tube, and which extends for approximately 210 to 220 degrees of the circumference of the inner tube, leaving a space between its ends. This reinforcing strip C normally fills up the deep groove of a deep rim, except through the limited portion between its ends; and in the portion of the inner tube between said ends covering 140 to 150 degrees of the circumference of the tube, I provide a bridge piece D, similar to one of those already described, which may be mounted on any suitable securing bolt, preferably the valve stem E, and held in place by the butterfly nut G. In order to firmly secure the reinforced part of the inner tube in place I may provide one or more bolts F with securing nuts G, but these bolts F may be omitted, if desired, as shown in Figure 17. When used, these bolts will project through the reinforcing strip C', and their heads $f$ will be on the interior of the inner tube, as shown in Figure 15.

It will be seen from Figs. 16 and 18 that the reinforced portion C' of the inner tube will fit into the groove $B^0$ and will prevent the beads of the tire from entering said grooves while the bridge piece D may be moved outwards, thus permitting a limited portion of the beads to be drawn into the groove when the tire is deflated, as has already been described with reference to the other constructions. When so drawn in, the entire tire may be conveniently slipped over the flanges on the opposite side of the rim and then the complete tire may be removed.

The form of device shown in Figs. 15 to 17 is especially adapted for use with old forms of rims having continuous deep grooves therein, and the reinforce piece C' to the inner tube not only serves to fill up this groove through a major portion of its length to prevent the beads of the casing from getting into said groove when not desired, but also serves to strengthen said inner tube at the points where it is likely to be pinched or worn by contact with the rim.

Thus, this reinforcing strip will add to the durability of the inner tube while at the same time serving to keep the beads of the tire from entering the groove.

While I have shown the bridge piece or pieces as preferably connected to the inner tube either on the inside or outside thereof, it may be entirely separate from the inner tube carried by the wheel body and rim. In such cases, when moved outward, it will obviously press the inner tube outward and clear the groove; or when pressed inwards, it will obstruct the groove and prevent the entrance of the beads of the tire therein.

The bridge piece being preferably in the form of a yielding pad, does not cut or abrade or otherwise injure the adjacent parts of the inner tube or tire casing, or casing flaps, but serves as an efficient obstruction to prevent the beads from entering the deep groove, except when desired.

While I have shown the invention in the preferred forms, it will be obvious that various changes might be made in construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. The combination with a deep rim for automobile wheels having annular bead seating shoulders and a bead receiving depression provided in its circumference, of means for preventing the beads from entering said depression, when desired, comprising a soft flexible pad, and means for moving said pad radially, into and out of said groove.

2. The combination with a deep rim for vehicle wheels comprising an annulus substantially channel shaped in cross section, and provided with annular bead seating shoulders, and a bead receiving groove, of a radially adjustable soft yielding pad adapted to be drawn into or forced out of said groove, for permitting or preventing the beads from entering said groove, as desired.

3. The combination with a deep rim for vehicle wheels comprising an annulus substantially channel shaped in cross section, and provided with annular bead seating shoulders, and a medial bead receiving groove, extending circumferentially through a part only of the circumference of said rim, of a radially adjustable soft pad adapted to be drawn into or forced out of said groove, and to prevent portions of the beads from entering said groove, or to permit the beads to be drawn into said groove, as desired.

4. The combination with a deep rim for automobile wheels having annular bead seating shoulders and a bead receiving depression provided in its circumference, of means for preventing the beads from entering said depression, when desired, comprising a soft flexible pad made mainly of soft rubber, and means for moving said pad radially, into and out of said groove.

5. The combination with a deep rim for vehicle wheels comprising an annulus substantially channel shaped in cross section, and provided with annular bead seating shoulders, and a bead receiving groove, of a radially adjustable soft yielding pad made mainly of soft rubber reinforced and provided with a yielding rib on its outer face, the said pad being adapted to be drawn into or forced out of said groove, for permitting or preventing said beads from entering said groove at will.

6. The combination with a deep rim for vehicle wheels comprising an annulus substantially channel shaped in cross section, and provided with annular bead seating shoulders, and with a medial circumferentially extending bead receiving groove between said shoulders, of a radially adjustable soft pad made mainly of soft rubber reinforced and provided with a yielding rib on its outer face, the said pad being adapted to be drawn into or forced out of said groove, for permitting or preventing said beads from entering said groove at will, a threaded stud passing through said rim and engaging said pad, and an adjusting nut engaging said stud, substantially as and for the purposes described.

7. In a vehicle wheel, the combination with a deep rim for vehicle wheels comprising an annulus substantially channel shaped in cross section, and provided with annular bead seating shoulders, and with a medial circumferentially extending bead receiving groove between said shoulders, of a tire casing provided with beads adapted to normally seat on said shoulders, an inner tube for compressed air, a radially adjustable soft pad attached to said inner tube, a threaded stud passing through said rim and engaging said pad, and an adjusting nut engaging said stud, substantially as and for the purposes described.

8. In a vehicle wheel, the combination with a deep rim for vehicle wheels comprising an annulus substantially channel shaped in cross section, and provided with annular bead seating shoulders, and with a medial circumferentially extending bead receiving groove between said shoulders, of a tire casing provided with beads adapted to normally seat on said shoulders, an inner tube for compressed air, a radially adjustable soft pad attached to said inner tube, said pad being composed of reinforced soft rubber, a threaded stud passing through said rim and engaging said pad, and an adjusting nut engaging said stud, substantially as and for the purposes described.

9. In a vehicle wheel, the combination with a deep rim for vehicle wheels comprising an annulus substantially channel shaped in cross section, and provided with annular bead seating shoulders, and with a medial circumferentially extending bead receiving groove between said shoulders, of a tire casing provided with beads adapted to normally seat on said shoulders, an inner tube for compressed air, a radially adjustable reinforced soft rubber pad secured to the inner tube, and means for drawing the said pad with the adjacent portion of the inner tube into or out of said groove, as desired.

10. In a vehicle wheel, the combination with a deep rim for vehicle wheels comprising an annulus substantially channel shaped in cross section, and provided with annular bead seating shoulders, and with a medial circumferentially extending bead receiving groove between said shoulders, of a tire casing provided with beads adapted to normally seat on said shoulders, an inner tube for compressed air, a radially adjustable reinforced soft rubber pad secured to the inner tube, and means for drawing the said pad with the adjacent portion of the inner tube into or out of said groove, as desired, said means comprising the screw threaded valve stem normally carried by the inner tube and projecting through said pad, and an adjusting nut carried by said valve stem.

11. A soft flexible bridge piece for use with deep groove rims comprising a pad made mainly of soft rubber and provided with a yielding engaging rib on the outer face thereof.

12. A soft flexible bridge piece for use with deep groove rims comprising a pad made mainly of soft rubber and provided with a yielding engaging rib on the outer face thereof, and with a perforated reinforcing plate embedded therein.

13. A soft flexible bridge piece for use with deep groove rims comprising a pad made mainly of soft rubber reinforced on its inner side and provided with a yielding engaging rib on the outer face thereof.

14. An inner tube for pneumatic tires for use with deep groove rims, provided with a soft yielding reinforcement adapted to fit in the groove of the rim, substantially as and for the purpose described.

15. An inner tube for pneumatic tires for use with deep groove rims, provided with a soft yielding reinforcement adapted to fit in the groove of the rim, with an adjusting bolt secured to said inner tube, substantially as and for the purpose described.

ANDRÉ JULES MICHELIN.